Oct. 15, 1940.   P. HEINISCH   2,218,425
MOTION PICTURE CAMERA
Filed March 20, 1937
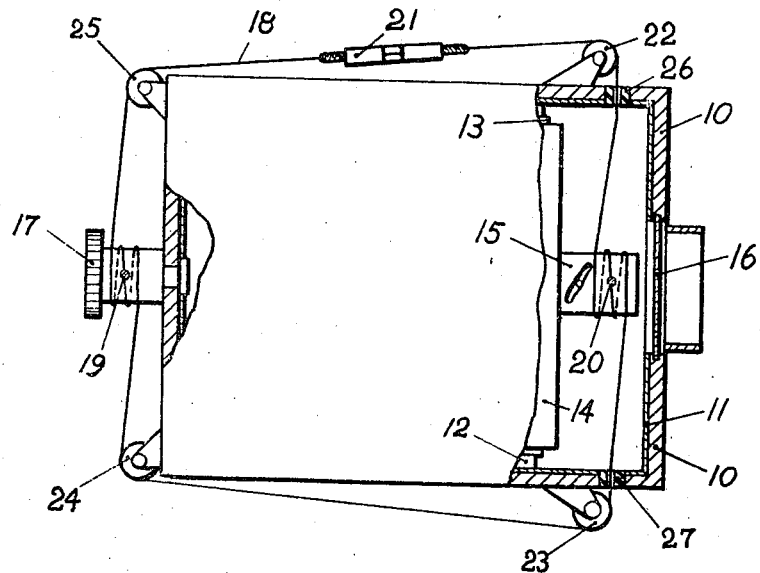
Inventor:
Paul Heinisch.

Patented Oct. 15, 1940

2,218,425

UNITED STATES PATENT OFFICE 2,218,425

MOTION PICTURE CAMERA

Paul Heinisch, Berlin-Zehlendorf, Germany, assignor to Askania-Werke A. G., a corporation of Germany Application March 20, 1937, Serial No. 132,137
In Germany March 20, 1936

2 Claims. (Cl. 88—17)

This invention relates to improvements in motion picture cameras.

The principal object of this invention is to prevent or lessen the transmission of noise created by the operating mechanism to the camera casing, more particularly in cameras for taking sound pictures.

I have found that even cameras having a sound-proofed casing will act as a source of disturbing noise on the microphone due to the fact that the vibrations of the camera mechanism are transmitted to the outside by the shafts for adjusting the diaphragm, shutter, and film feeding mechanism, and for operating the focussing mechanism. Such shafts are usually provided with a knob or handle at the outside of the camera casing.

According to the invention I therefore employ an operative connection between the adjusting members of the camera mechanism, which is mounted inside of a sound-dampening casing, and the operating members being mounted on the outside of said casing by means of a flexible belt connection, which does not transmit sound, the belt being led through narrow openings provided in the walls of said dampening casing. The flexible belt, as understood in this description, may also assume the form of a cord, wire or chain, as may be most suitable for each particular purpose.

Further objects, aims and advantages of this invention will appear from a consideration of the description which follows with the accompanying drawing showing embodiment of my invention for illustrative purposes.

It is to be understood that this description is not to be taken in a limiting sense, the scope of the invention being defined in the appended claims.

Referring to the drawing, the figure is a simplified diagrammatic side elevation of a camera, partly in section.

For the sake of clearness the drawing is simplified by omitting such details as are dispensable in illustrating this invention.

In the figure the invention is shown as applied to the focussing device of a moving picture camera. In the camera casing 10, which may be of conventional construction and may be further provided with sound lessening lining 11 there is mounted in vibration absorbing mountings 12 and 13 a support for the camera mechanism, shown as being a housing 14. A focussing tube 15 protrudes from the front side of the housing oppositely a transparent window 16 in the camera casing. The focussing device is adjustable from the outside by means of an operating member, shown as being a milled knob 17 rotatably mounted on the camera casing. For operative connection there is provided a belt 18 which may also take the form of a thin steel wire, or ribbon. The belt is shown as secured to the respective parts by means of machine screws 19 and 20 thus preventing slipping of the same. The cable which may be suitably provided with a turnbuckle 21 is led over guide rollers 22, 23, 24 and 25 and led through the walls of the casing in bushings 26 and 27 of sound and vibration dampening material, such as felt or rubber.

Obviously the present invention is not limited to the particular embodiment herein shown and described. Moreover it is not indispensable that all the features of this invention be used conjointly since they may be employed advantageously in various combinations and subcombinations.

What is claimed is:

1. A sound-proof motion picture apparatus comprising a sound damping casing having a pair of narrow openings in the walls thereof, a camera mechanism mounted inside of said casing, said camera including a rotatable adjusting tube for the camera mechanism at one side thereof, an operating member mounted on the outside of the casing on the side opposite the adjusting tube, a flexible belt secured to said adjusting tube and operating member and passing through said openings, said belt passing around the tube and the member a plurality of turns, and guide means on the casing to guide the belt from the back of the casing around two opposite sides thereof and into the openings so that a rotation of the operating member in either direction will adjust the tube correspondingly.

2. A sound-proof motion picture apparatus according to claim 1, in which a bushing of sound damping material is provided in each opening in the casing and through which the belt passes.

PAUL HEINISCH.